United States Patent
Krug et al.

[11] Patent Number: 6,047,596
[45] Date of Patent: Apr. 11, 2000

[54] STRESS TEST RIG FOR HELICOPTER GEAR UNITS

[75] Inventors: Herbert Krug, Hofgeismar; Detlef Brüggemann, Ahnatal; Günter Schröder, Niestetal, all of Germany

[73] Assignee: ZF Luftfahrttechnik GmbH, Calden, Germany

[21] Appl. No.: 09/142,308

[22] PCT Filed: Apr. 19, 1997

[86] PCT No.: PCT/EP97/01987

§ 371 Date: Sep. 3, 1998

§ 102(e) Date: Sep. 3, 1998

[87] PCT Pub. No.: WO97/41415

PCT Pub. Date: Nov. 6, 1997

[30] Foreign Application Priority Data

Apr. 26, 1996 [DE] Germany ............ 196 16 729

[51] Int. Cl.[7] .................................................. G01M 13/02
[52] U.S. Cl. ........................................ 73/162; 73/178 H
[58] Field of Search .................... 73/162, 178 H, 73/774

[56] References Cited

U.S. PATENT DOCUMENTS

| | | | |
|---|---|---|---|
| 2,981,103 | 4/1961 | Livezey | 73/162 |
| 4,159,642 | 7/1979 | Hudson et al. | 73/118 |
| 4,391,131 | 7/1983 | Scourtes | 73/118 |
| 4,601,198 | 7/1986 | Kolitsch | 73/118.1 |
| 5,077,671 | 12/1991 | Leslie et al. | 364/424.03 |
| 5,113,704 | 5/1992 | Yano et al. | 73/162 |
| 5,219,389 | 6/1993 | Gutman | 73/162 |
| 5,307,676 | 5/1994 | Gutman | 73/162 |
| 5,373,735 | 12/1994 | Gutman | 73/162 |
| 5,477,740 | 12/1995 | Shioya et al. | 73/862.191 |
| 5,696,896 | 12/1997 | Mistral et al. | 73/865.9 |

FOREIGN PATENT DOCUMENTS

| | | |
|---|---|---|
| 1 865 708 | 11/1962 | Germany . |
| 78 12 143 | 8/1978 | Germany . |
| 29 48 517 C2 | 6/1981 | Germany . |
| 33 11 618 A1 | 10/1984 | Germany . |
| 34 10 702 A1 | 9/1985 | Germany . |
| 43 25 403 C2 | 2/1995 | Germany . |
| 1 461 954 | 1/1977 | United Kingdom . |

OTHER PUBLICATIONS

*Antribstechnik* 11 (1972) Nr. 9, "Prüstaände für Getriebe, Wellen, Kupplungen", by Dipl.–Ing. Friedrich Klinger, Darmstadt, pp. 332–336.

*VDI–Z* 115 (1973) Nr. 2, "Getriebe–Verspannungsprüfstände für Forschung und Entwicklung" by Von Konrad Langenbeck VDI and Heinrich Benthake, Mülheim (Ruhr), pp. 115–121.

*Antriebstechnik* 22 (1983) Nr. 10, "Prüfstände mit verspannten Getrieben" by Gunter1 Basedow, pp. 32–38.

*Elektronik* 14/1991, "Neuronale Netze beherrschen hoch–komplexe Regelungssysteme" by Dr. Hans Geiger, Dagmar Böller and Dieter Butz, pp. 83–94.

*Automatisierungstechnik* 43 (1995) 6, "Regelung von Prüfständen mit neuronalen Netzen" by Tomas Hrycej, Ulm, pp. 297–304.

Japanese Abstract, vol. 096, No. 004, dated Apr. 4, 1996 of JP 07 325017A (Toyo Electric Mgf. Co. Ltd.).

*Primary Examiner*—Max Noori
*Attorney, Agent, or Firm*—Davis and Bujold

[57] ABSTRACT

The stress test rig consists of a rigidly mounted part which contains the devices uniformly used for all types of test gears and an assembly truck (37) which holds the test gear (16) and the required adapter devices. A test rig gear unit (2) forms a continuous stress circuit with a superimposed gear unit (9), an adaptation gear (23) and a second test rig gear (19) wherein the stress torque is set by a control unit (15) through the superimposed gear unit (9). The regulation variable for the stress torque is determined up to more than 80% by a control network (31). The test rig gear unit (2) is a bevel gear wheel and the superimposed gear unit (9) has a bevel gear step (13) so that the output shaft (14) of the superimposed gear unit (9) is pivoted and has a height adapted to an input shaft of an adaptation gear unit (23) or of a test gear unit (16).

20 Claims, 3 Drawing Sheets

STRESS TEST RIG FOR HELICOPTER GEAR UNITS

The invention concerns a stress test rig for helicopter gear units.

BACKGROUND OF THE INVENTION

The core part of a helicopter is its main rotor. With its two and more rotor blades, which are hinged on a rotor head and pivotally supported about their longitudinal axis, the main rotor supplies not only lift but also propulsion.

One or more gas turbines drive the main rotor by a gear unit and a main rotor shaft which is rotatably mounted in the gear unit and secured to the rotor head.

The helicopter often also has a driven tail rotor so that the gear unit has a plurality of power inputs for the gas turbines and several outputs for the rotors.

High standards of safety apply to helicopters. Therefore, the parts and units must be subjected to long tests in the development and trial with an input power of more than 1,000 kW for the main rotor and speeds of approximately 20,000 r.p.m. on the power inputs of the gear unit, this requires a high power test rig installation.

To test power-transmitting parts and units such as gear units, clutches, shafts, etc., two kinds of test rigs are known ("Antriebstechnik" 11, 1972, No. 9, pages 332–336; "VDI-Z" 115, 1973, No. 2, pages 115–121; "Antriebstechnik" 22, 1983, No. 10, pages 32, 34, 36 and 38), so-called brake rigs in which the input power passes via a specimen from a prime mover to a braking device and so-called stress test rigs in which the testing power revolves in a stress circuit in which the specimen is enclosed and a prime mover covers only the power losses resulting therefrom. In the second case, the specimen is loaded by a torque which is composed of the stress torque and the torques to be applied by the prime mover which result from the lost power and the drag torques.

Because of the small energy they require, stress test rigs are especially appropriate for gear units with great transmissible power, for example, in the vehicle and aircraft technology.

The stress torque can be rigidly set by a stress device. But it is also known (DE-CE 43 25 403) to change, control, or regulate the stress torque during the test. For this purpose, an electric control unit regulated by microprocessor serves, for example, an engine or generator, which via a highly geared superimposed gear, such as in the form of a maintained-wave gear unit, engages the stress circuit and produces a turning angle between the input and output. At the same time, the speed on the gear input or gear output can be adapted to the reduction ratio of the specimen without changing the test rig gear unit, since the control unit on the superimposed gear unit sets a corresponding drag speed. It is thus possible upon the same test rig to test gear units of different speed and torque requirements insofar as the input and output shafts of the gear unit are similarly arranged. If that is not the case, the test rigs must be adapted to the spatial conditions of the specimens. This involves a high expenditure when test rig gear units and superimposed gear units have to be exchanged.

The extensive assembly work for adapting the test rig to a new kind of gear unit in addition causes a long down time during which the costly investment cannot be used. Besides, the down times prolong, for example, the development time of the gear unit to be tested.

SUMMARY OF THE INVENTION

The problem to be solved by the invention is better to balance the stress test rigs, particularly for testing helicopter gear parts.

As mentioned above, the helicopter gear units differ by the number and position of the input and output shafts. Also different are the powers, torques, speeds and at times the direction of rotation to be transmitted. In the stress test rig, according to the invention, a large part of the test rig remains the same for all types of gear units of a power class while the differences of the gear unit types are compensated by adaptation devices.

The test gear units together with the adaptation devices are pre-assembled on an assembly truck and when changing the gear units are moved with the assembly truck to the rigidly mounted part of the test rig and attached thereto. Thereby are spared, together with investment costs for numerous different test rigs, assembly costs by the rapid preparation. At the same time, expensive test rigs can be better balanced, since during the test of one gear unit, one other can already be pre-assembled.

A so-called continuous stress system is used in the stress test rig, according to the invention. Since in one stress circuit the test power is recovered, the prime mover, an electric motor, only has to apply the power loss and be designed therefor. This spares energy and investment costs. By the electric control unit a desired torque can be set, maintained, or changed during the course of the test. Besides, the input speed can be adjusted on the test gear unit, since the control unit sets a corresponding drag speed on the superimposed gear unit.

Since the types of test gear units differ also by the distances between axes and the angles formed by the input shafts with one another and with the output shafts, the position of the test gear unit must be adequately adapted. It is possible using the test rig gear unit in the shape of a bevel gear wheel and the bevel gear step on the superimposed gear unit to rotate the output shaft of the superimposed gear unit about the output shaft of the test rig gear unit and thus adjust it to the height of the input shaft of the test gear unit or of an adaptation gear unit without the position of the rigidly installed test rig gear unit being changed.

Numerous features in this connection are shown and described in the specification and in the claims. The expert will conveniently consider separately the combined features in accordance with the problems to be solved and make with them logical combinations.

BRIEF DESCRIPTION OF THE DRAWINGS

Other details of the invention are more particularly explained herebelow with the enclosed drawings with reference to embodiments. In the drawings.

DESCRIPTION OF THE PREFERRED EMBODIMENT

Figure 1:
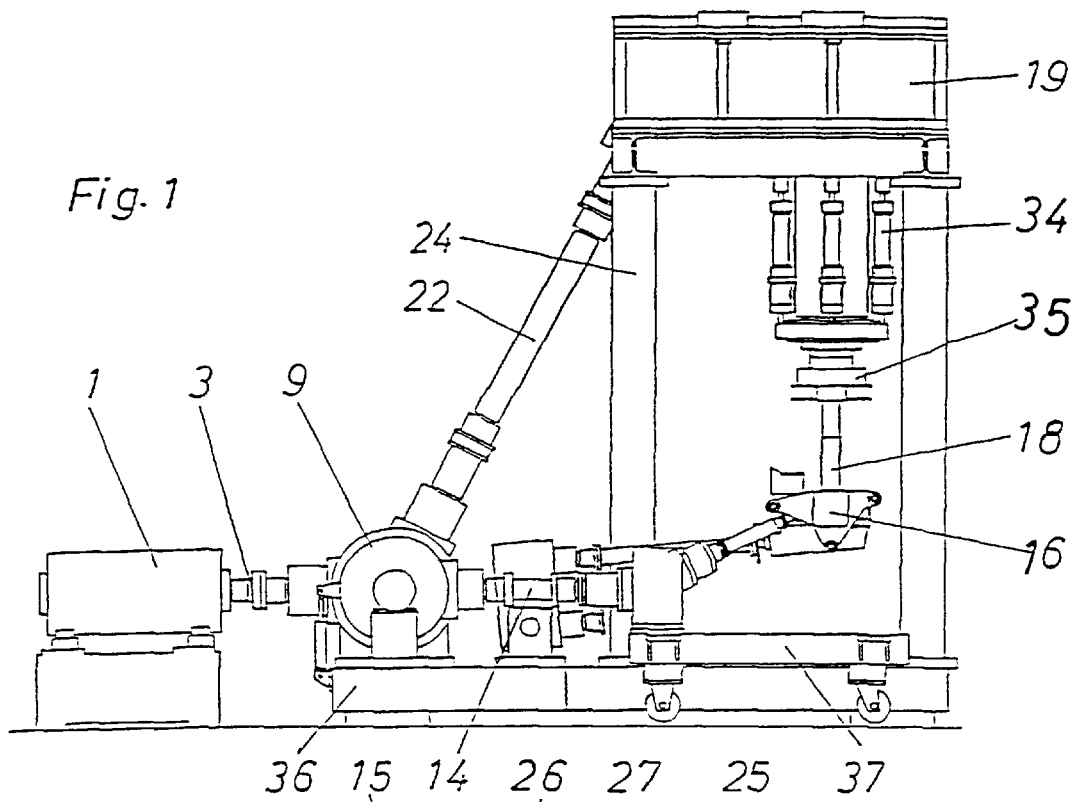
FIG. 1 is an elevation of a stress test rig.
Figure 2:
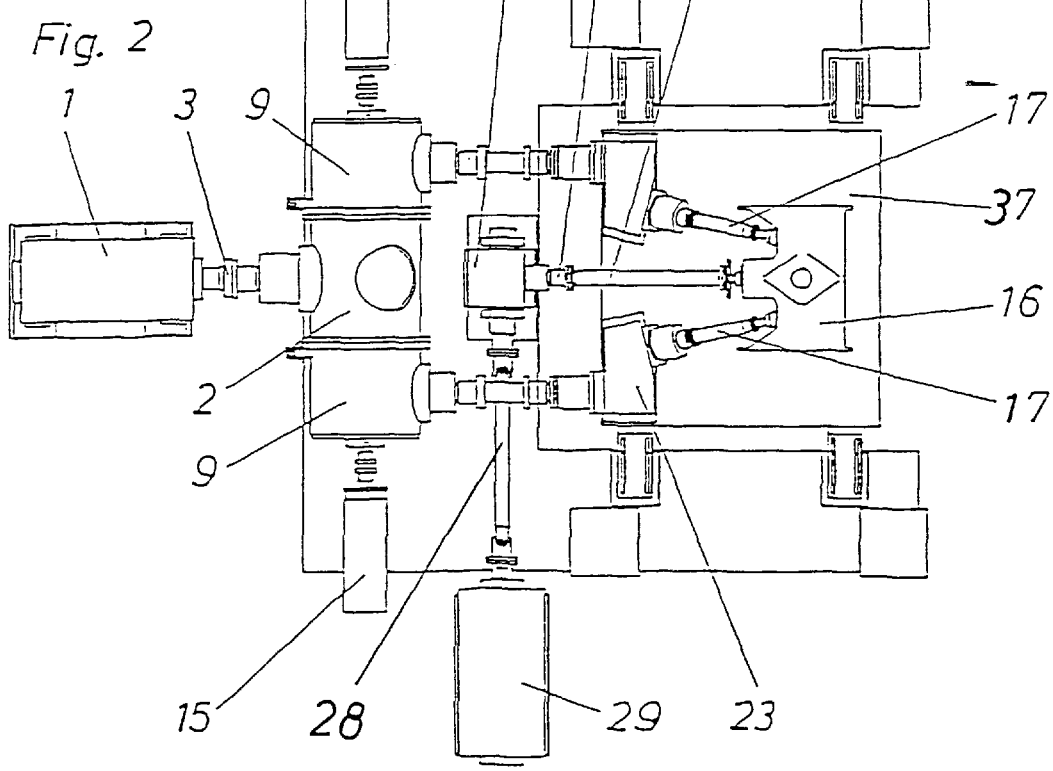
FIG. 2 is a plan of the stress test rig according to FIG. 1.
Figure 4:
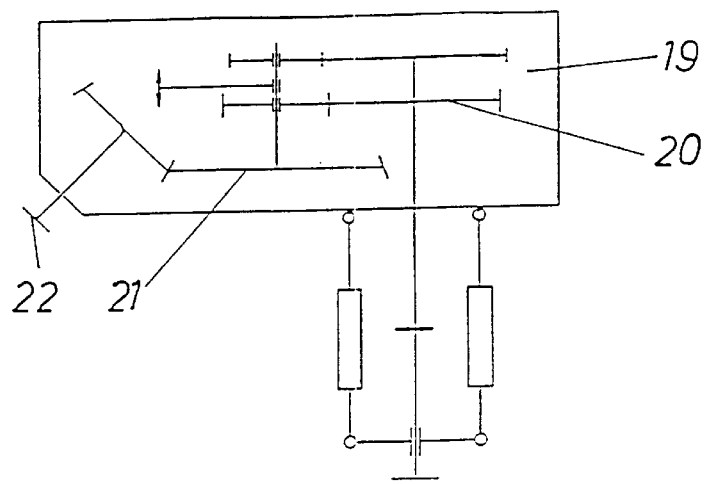
FIG. 4 is a diagrammatic design of a second test rig gear unit.
Figure 3:
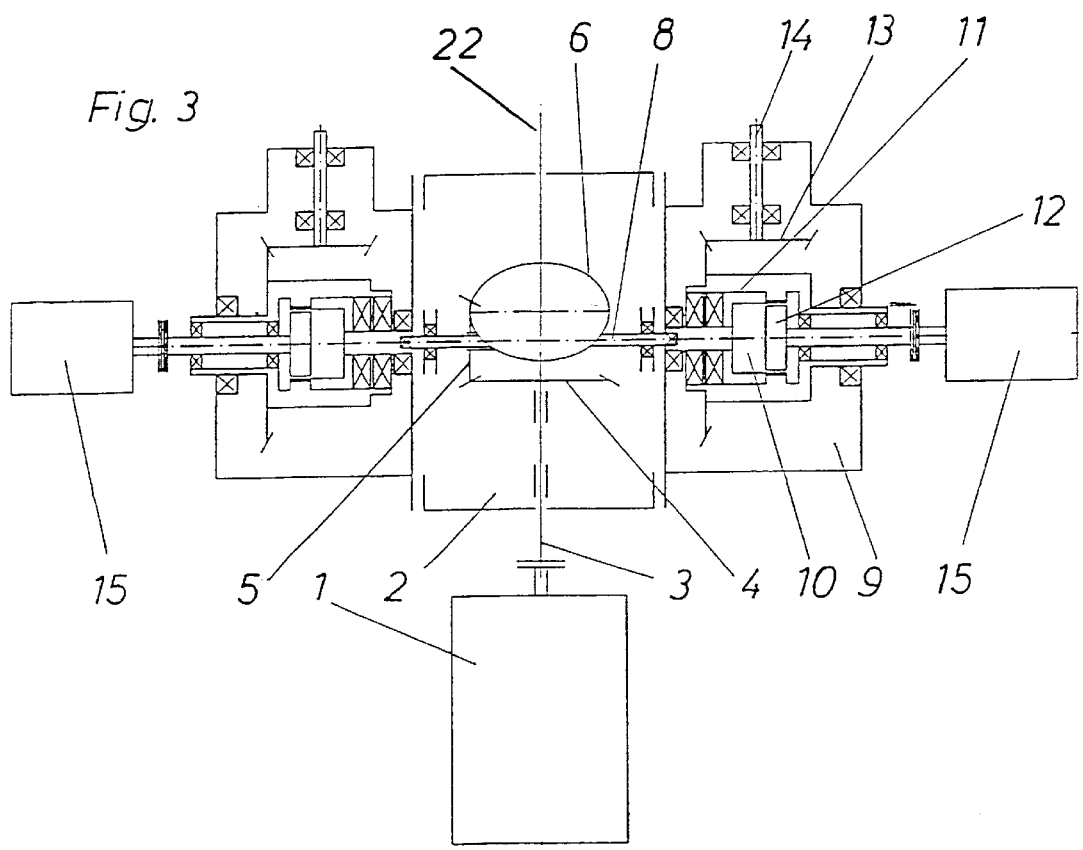
FIG. 3 is a fundamental design of a test rig gear unit and a superimposed gear unit.
Figure 5:
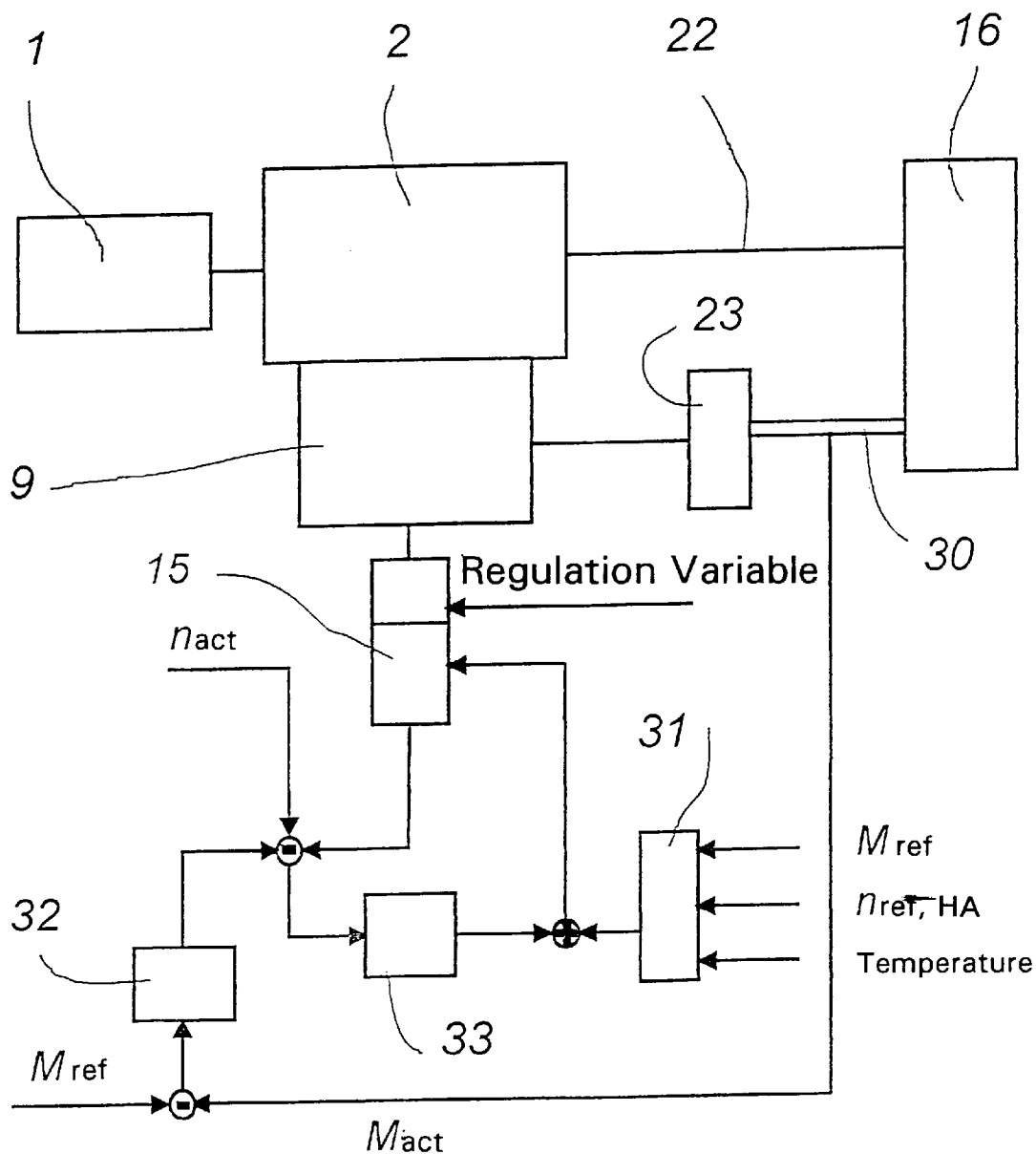
FIG. 5 is a fundamental circuit diagram for regulation of a test torque.

A motor 1, which is supported on a foundation, drives, via an input shaft 3, a first test rig gear unit 2. This is a bevel gear with a bevel gear 4 which is secured to the input shaft 3 and meshes with another bevel gear 5 which is secured to an output shaft 8.

On both sides of the test rig gear unit 2 is situated a respective superimposed gear unit 9. Many kinds of superimposed gear units can be used but the stress shaft gear units, shown here, are specially well suited for this purpose because of their high ratio and low moment of inertia.

The superimposed gear units each essentially comprise a hollow shaft 10 connected with the output shaft 8 and carries an external spline. The hollow shaft 10 is telescopic. Thereby a camshaft 12 rotating inside it can engage the external spline of the hollow shaft 10 with an internal spline of a ring gear 11. The camshaft 12 is driven by a control unit 15 which contains an electric servomotor.

The ring gear 11 is connected with a bevel gear of a bevel gear stage 13, the other bevel gear of which is secured to an output shaft 14. The output shaft 14 is pivotable around the axis of the output shaft 8 of the test gear unit 2 either together with its superimposed gear unit 9 which for this purpose is briefly disengaged from the test rig gear unit 2, or alone, since it can sweep through a window into the housing of the superimposed gear unit 9, together with a bearing housing pivoted on this housing of the superimposed gear unit 9. The output shaft 14 can thus be adjusted in height to the shaft connection of an input shaft of an adaptation gear 23 or of a test gear unit 16 without it being necessary to change the position of the test rig gear unit.

The test gear unit 16 is mounted together with the adaptation gears 23 on an assembly truck 37 and is attached by standardized connecting devices to the rigidly mounted part of the stress test rig and this both in relation to the power-transmitting parts and to the supply and measuring lines. The adaptation gears 23 take over adaptation to the existing type of test gear unit 16 which cannot be achieved by the rigidly mounted part of the stress test rig.

A second test rig gear unit 19 is located above the test gear unit 16 in a test rig frame 24. This has a two-step selector gear 20 of a countershaft design and a downstream bevel gear step 21 connected by a connecting shaft 22 with a bevel gear 6 of the test rig gear unit 2. The stress circuit is thus completed by a main output shaft 18 of the test gear unit 16 which drivingly connects the test gear unit 16 with the second test rig gear unit 19.

The main output shaft 18 corresponds to a main rotor shaft of a helicopter. By the switchable steps of the second test rig gear unit 19, it is possible to cover a broad speed range for rotors of different configurations.

On the main output shaft 18 can be applied, via an adapter 35, through actuators 34 of a simulator, forces and torques simulating those that in practice appear in a flight control of a helicopter.

Aside from the motor 1, which is secured to its own foundation, the rigidly mounted parts of the stress test rig, the test rig gear unit 2, the superimposed gear units 9, the test rig frames 24 with the second test rig gear unit 9, etc. are mounted on a base plate 36 which is vibration dampingly supported. Thereby are to a great extent prevented transmission of vibration to the surroundings of the stress test rig.

The test gear unit 16 has a second input shaft 25 which corresponds to a rear rotor shaft of a helicopter. The rear rotor shaft is coupled with an input shaft 27 of a bevel gear 26. The input shaft 27, like the output shaft 14 of the superimposed gear unit 9, is pivotally supported around an output shaft 28 of the bevel gear 26. The reason for the rotation of the gear unit 26 around the axis 28 is that with different angles of inclination of the shaft 25 (=the position of the rear rotor output shaft), the installation position of the brake generator 29 does not have to be engaged. The second output shaft 25 is not included in the stress circuit, but is loaded by a brake generator 29, which feeds the brake power back into the supply network. Since the rear rotor utilizes little power in relation to the main rotor, this solution is convenient with regard to investment and energy costs, the same as to adaptability.

The control units 15 each apply the desired stress torque, via its servomotor and superimposed gear unit 9, with the current of the servomotor serving as regulation variable. The latter is controlled depending on the actual speed and on a reference value/actual value comparison of the torque of the input shaft 17 of the test gear unit 16 via a proportionally acting regulator 32 and a proportionally integrally acting regulator 33. The actual torque is detected by a torque-measuring shaft 30 and a corresponding signal is passed on to the proportionally acting regulator 32.

The regulation is superimposed by a control through a control (neuronal) network 31, which sets the regulation variable for the control unit 15, specially the current of the electric servomotor, to more than 80% depending on input variables. As input variables are the reference torque M__ref, the reference speed of the input shaft 17 n__ref HA and the oil temperature of the superimposed gear unit 9. The input variables here can be evaluated in common separately or jointly. More particular details about neuronal networks are known to the expert, for example, from "Kleiner Handbuch Neuronale Netze" Vieweg Verlag, Braunschweig, 1993. By such a combined control and regulation, it is possible to produce a very uniform, torsion-free torque or set the torque load profile.

What is claimed is:

1. A stress test rig for a helicopter gear unit (16) having:
    a motor (1) driving a first test rig gear unit (2), the first test rig gear unit (2) providing a stress circuit via a plurality of shafts;
    at least one superimposed gear unit (9);
    a second test rig gear unit (19);
    a test gear unit (16);
    wherein the motor (1) is coupled to an output shaft (8) of the first test rig gear unit (2) by an input shaft (3) and a bevel gear connection (4, 5) contained within said first test rig gear unit (2), the output shaft (8) of the first test rig gear unit (2) lies at an angle relative to said input shaft (3) and is coupled to the at least one superimposed gear unit (9) via a control unit (15), said at least one superimposed gear unit (9) couples the output shaft (8) of the first test rig gear unit (2) to an output shaft (14) of the superimposed gear unit (9) via a bevel gear (13), the output shaft (14) of the superimposed gear unit (9) is pivotable around a rotational axis of said output shaft (8) of the first test rig gear unit (2) and is connectable with an input shaft (17) of said test gear unit (16), and a main output shaft (18) of said gear unit (16) is connectable with said first test rig gear unit (2) via said second test rig gear unit (19).

2. The stress test rig according to claim 1, wherein an adaptation gear unit (23) couples said output shaft (14) of said superimposed gear unit (9) with said input shaft (17) of said test gear unit (16).

3. The stress test rig according to claim 1, wherein said second test rig gear unit (19) is a switchable, two-ratio bevel gear wheel assembly which is housed within a test rig frame (24) located vertically above said test gear unit (16).

4. The stress test rig according to claim 1, wherein said at least one superimposed gear unit (9) is a highly stress shaft gear which comprises an internally splined ring gear (11) connected with the output shaft (14) of the superimposed gear unit (9) via said bevel gear (13), an externally splined telescopic hollow shaft (10) is connected with said output shaft (8) of said first test rig gear unit (2), and a camshaft (12), connected with said control unit (15), facilitates connection of said hollow shaft (10) with said ring gear (11).

5. The stress test rig according to claim 1, wherein a second superimposed gear unit (9) is also coupled to the output shaft (8) of the first test rig gear unit (2), and the second superimposed gear unit (9) is connected with a second input shaft (17) of said test gear unit (16).

6. The stress test rig according to claim 1, wherein a second output shaft (25) of said test gear unit (16) is connected with a brake generator (29) by a bevel gear (26) which has an input shaft (27) pivotable around an axis of an output shaft (28) of said bevel gear (26).

7. The stress test rig according to claim 1, wherein a reference torque signal ($M\_ref$) is compared with an actual torque signal ($M\_act$) and a control signal is derived from that comparison and fed to said control unit (15).

8. The stress test rig according to claim 2, wherein a torque measuring shaft (30) is located between said test gear unit (16) and said adaptation gear (23).

9. The stress test rig according to claim 7, wherein, based on desired input variables, a regulation variable for said control unit (15) is set by a control network (31) to more than 80%, and the input variables comprise at least one of the following variables: (a) a reference torque ($M\_ref$), (b) a reference speed ($n\_ref\,HA$) of a main drive of the stress test rig, and (c) an oil temperature of said control unit (15).

10. The stress test rig according to claim 7, wherein the reference torque signal takes into account periodically changing loads.

11. The stress test rig according to claim 3, wherein a simulator, with actuators (34) for simulating forces and torques which appear during flight of a helicopter, is mounted between said test rig frame (24) and said main output shaft (18).

12. The stress test rig according to claim 11, wherein an adapter (35) attaches said simulator to the main output shaft (18) of said test gear unit (16).

13. The stress test rig according to claim 1, wherein said stress test rig comprises a rigidly mounted unit carrying a plurality of gear unit devices, and said rigidly mounted unit is supported on at least one base plate (36) which is damped to minimize vibration to said rigidly mounted unit.

14. A stress test rig for a helicopter gear unit (16) having:
a motor (1) driving a first test rig gear unit (2), the first test rig gear unit (2) providing a stress circuit via a plurality of shafts;
at least one superimposed gear unit (9);
a second test rig gear unit (19);
said stress test rig comprising a rigidly mounted unit carrying a plurality of gear unit devices, and an assembly truck (37) supporting said rigidly mounted unit, a test gear unit (16) and associated adaptation devices;
wherein the motor (1) is coupled to an output shaft (8) of the first test rig gear unit (2) by an input shaft (3) and a bevel gear connection (4,5) contained within said first test rig gear unit (2), the output shaft (8) of the first test rig gear unit (2) lies at an angle relative to said input shaft (3) and is coupled to the at least one superimposed gear unit (9) via a control unit (15), said at least one superimposed gear unit (9) couples the output shaft (8) of the first test rig gear unit (2) to an output shaft (14) of the superimposed gear unit (9) via a bevel gear (13), the output shaft (14) of the superimposed gear unit (9) is pivotable around a rotational axis of said output shaft (8) of the first test rig gear unit (2) and is connectable with an input shaft (17) of said test gear unit (16), and a main output shaft (18) of said gear unit (16) is connectable with said first test rig gear unit (2) via said second test rig gear unit (19).

15. The stress test rig according to claim 14, wherein an adaptation gear unit (23) couples said output shaft (14) of said superimposed gear unit (9) with said input shaft (17) of said test gear unit (16).

16. The stress test rig according to claim 14, wherein said second test rig gear unit (19) is a switchable, two-ratio bevel gear wheel assembly which is housed within a test rig frame (24) located vertically above said test gear unit (16).

17. The stress test rig according to claim 14, wherein said at least one superimposed gear unit (9) is a highly stress shaft gear which comprises an internally splined ring gear (11) connected with the output shaft (14) of the superimposed gear unit (9) via said bevel gear (13), an externally splined telescopic hollow shaft (10) is connected with said output shaft (8) of said first test rig gear unit (2), and a camshaft (12), connected with said control unit (15), facilitates connection of said hollow shaft (10) with said ring gear (11).

18. The stress test rig according to claim 14, wherein a second superimposed gear unit (9) is also coupled to the output shaft (8) of the first test rig gear unit (2), and the second superimposed gear unit (9) is connected with a second input shaft (17) of said test gear unit (16).

19. The stress test rig according to claim 14, wherein a second output shaft (25) of said test gear unit (16) is connected with a brake generator (29) by a bevel gear (26) which has an input shaft (27) pivotable around an axis of an output shaft (28) of said bevel gear (26).

20. The stress test rig according to claim 14, wherein a reference torque signal ($M\_ref$) is compared with an actual torque signal ($M\_act$) and a control signal is derived from that comparison and fed to said control unit (15).

\* \* \* \* \*